United States Patent [19]

Province

[11] 3,789,493
[45] Feb. 5, 1974

[54] HYDRAULIC ACTUATED FUSION UNIT FOR PLASTIC PIPE

[75] Inventor: William F. Province, Bartlesville, Okla.

[73] Assignee: The Ridge Tool Company, Bartlesville, Okla.

[22] Filed: Feb. 7, 1972

[21] Appl. No.: 223,855

[52] U.S. Cl............... 29/282, 29/237, 29/252, 254/29 R, 254/93 R
[51] Int. Cl............................................. B23p 19/04
[58] Field of Search.......... 29/237, 252, 243.5, 282; 254/29 R; 92/110, 117

[56] References Cited
UNITED STATES PATENTS
409,008  8/1889  Breymann..................... 254/29 R
2,404,639  7/1946  Lane................................. 92/117 A Primary Examiner—Granville Y. Custer, Jr.
Assistant Examiner—Harold P. Smith, Jr.
Attorney, Agent, or Firm—James R. Head et al.

[57] ABSTRACT

This invention describes an improved method of supporting and axially traversing a movable pipe clamping means in a fusion type plastic pipe joining apparatus. Two rods are provided, one on each side of the frame, on which are supported hydraulic cylinders. Pistons are mounted centrally on the rods and the cylinders are adapted to fit the pistons and also to seal along the rods which serve both as support and guide rods and as pistons rods. The movable pipe clamp is supported by the two cylinders and is adapted to slide axially supported on the two piston rods. The piston rods are drilled axially from each and so that hydraulic fluid can be inserted through the axial conduits into the cylinder spaces on each side of the pistons so that by applying pressurized liquid to one side or the other of the pistons the cylinders carrying the movable pipe clamp, and movable pipe section, can be traversed axially.

3 Claims, 3 Drawing Figures

3,789,493

HYDRAULIC ACTUATED FUSION UNIT FOR PLASTIC PIPE

BACKGROUND OF THE INVENTION

This invention lies in the field of pipe joining apparatus. More particularly, it is concerned with means for joining plastic pipe by the fusion process.

In recent years there has been increasing and widespread use of plastic pipe for many purpoes in the field of hydraulics. Various methods have been devised for joining these pipes, one of those in common usage is called the fusion type pipe joining system. As fully described in my copending application, entitled "Improved Facing Tool For Plastic Pipe Fusion Apparatus," this method involves an apparatus which includes two coaxial, spaced, pipe clamping means one of which is fixed to a frame and supports the end of the already joined pipe sections. The other is movable axially over a limited range and supports the new section of pipe which is to be joined to the existing pipeline. Means are provided for facing the ends of the two pipes to a true perpendicular plane. Next a heating means is inserted between the two pipe ends and the movable clamp is adjusted so as to press the two pipes together against the two faces of the heating unit until the plastic reaches a prescribed temperature. The pipes are then separated, the heater is withdrawn and the two pipes are pressed together, with sufficient force to press the softened plastic into intimate contact, and to hold them in that position until the plastic is cooled and hardened. Thus, means must be provided for longitudinally moving the movable pipe clamp and its section of pipe back and forth during the several operations required to join the two pipes. In most instances the means provided for moving the pipes are manual levers which are, of course, adequate for small size pipes, but are not adequate for large size pipes.

SUMMARY OF THE INVENTION

It is a principal object of this invention to provide a fusion pipe joining apparatus in which the movable pipe clamp is adapted to be moved by hydraulic means.

This and other objects of this invention are accomplished and the limitations of the prior art are overcome by the apparatus of this invention for hydraulically traversing the movable pipe clamp. The fixed pipe clamp is fixedly mounted on a frame, and supports the pipeline composed of already joined sections of pipe. Attached to the frame are two spaced rods which are parallel to the axis of the fixed clamp, on which the movable pipe clamp is adapted to slide. The sliding means comprises a cylinder which has an internal bore larger than the diameter of the rods, and end plates which have sealing means to slide on and seal to the rods. These two rods are utilized as piston rods by fastening pistons at their centers, which are adapted to seal to the inside bore of the cylinder. The rods are drilled axially from each end to a point adjacent the nearest surface of the piston so that hydraulic fluid under pressure can be introduced through the axial conduits and through the walls of the rods into the two spaces on each side of the pistons. When the high pressure hydraulic fluid is introduced on one side of the pistons, the cylinders and, of course, the supported movable pipe clamp, are driven in one direction, and when fluid is introduced through the other ends of the rods the cylinders and movable pipe clamp will be driven in the other direction. Thus, the piston rods serve not only to support the pistons, they also conduct the hydraulic fluid into the cylinder chambers, and also, through the cylinders, they support the movable pipe clamp. A conventional hydraulic system is provided, with valves which permit changing the flow of high pressure liquid from one end to the other end of each of the piston rods.

BRIEF DESCRIPTION OF THE DRAWINGS

FIG. 3 is a sectional view taken on line 3—3 of FIG. 1.

DESCRIPTION OF THE PREFERRED EMBODIMENT

Figure 1:
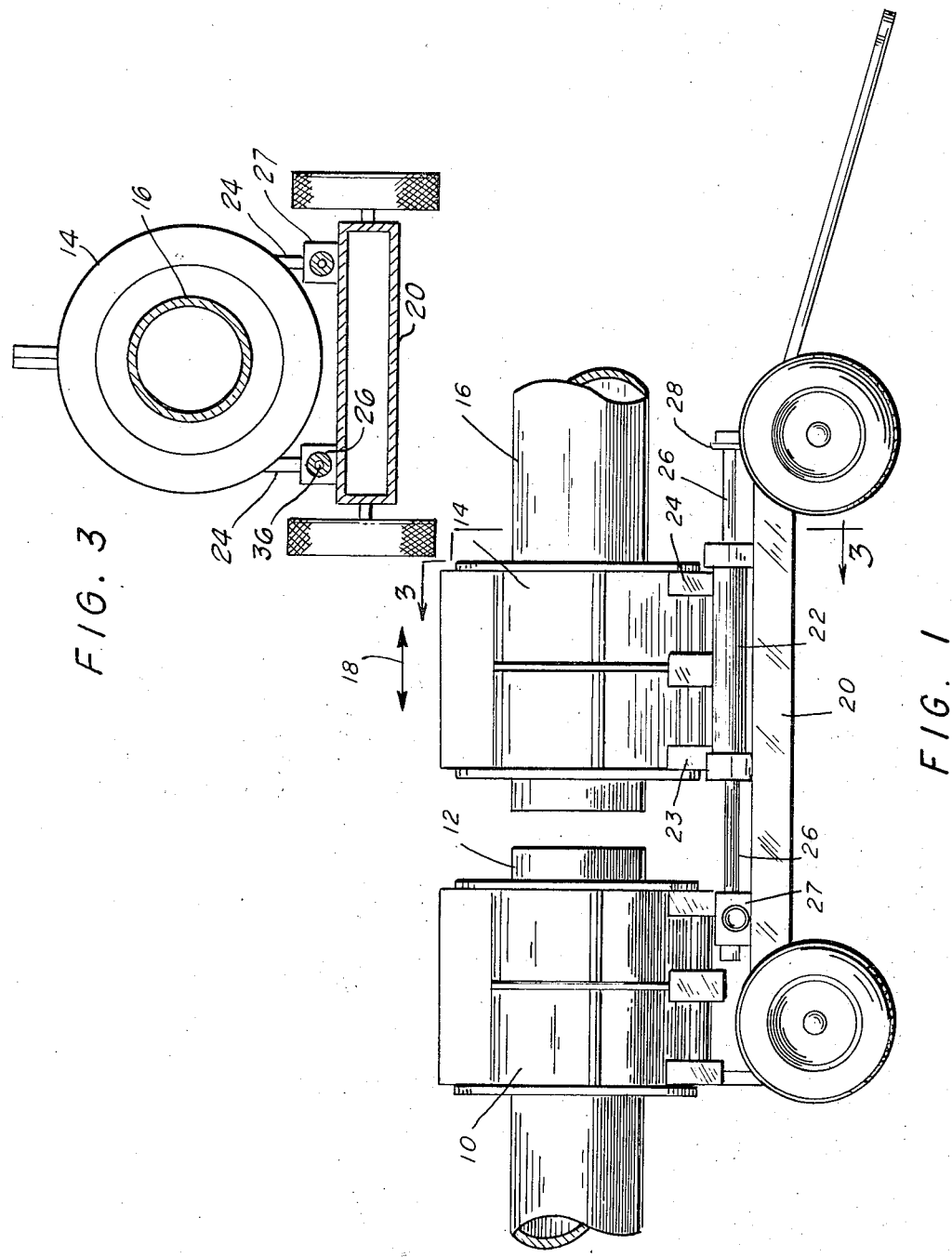
FIG. 1 is an elevational view of a plastic pipe fusion apparatus embodying the improved means of supporting and axially displacing a movable pipe clamp relative to a stationary pipe clamp.
Figure 2:
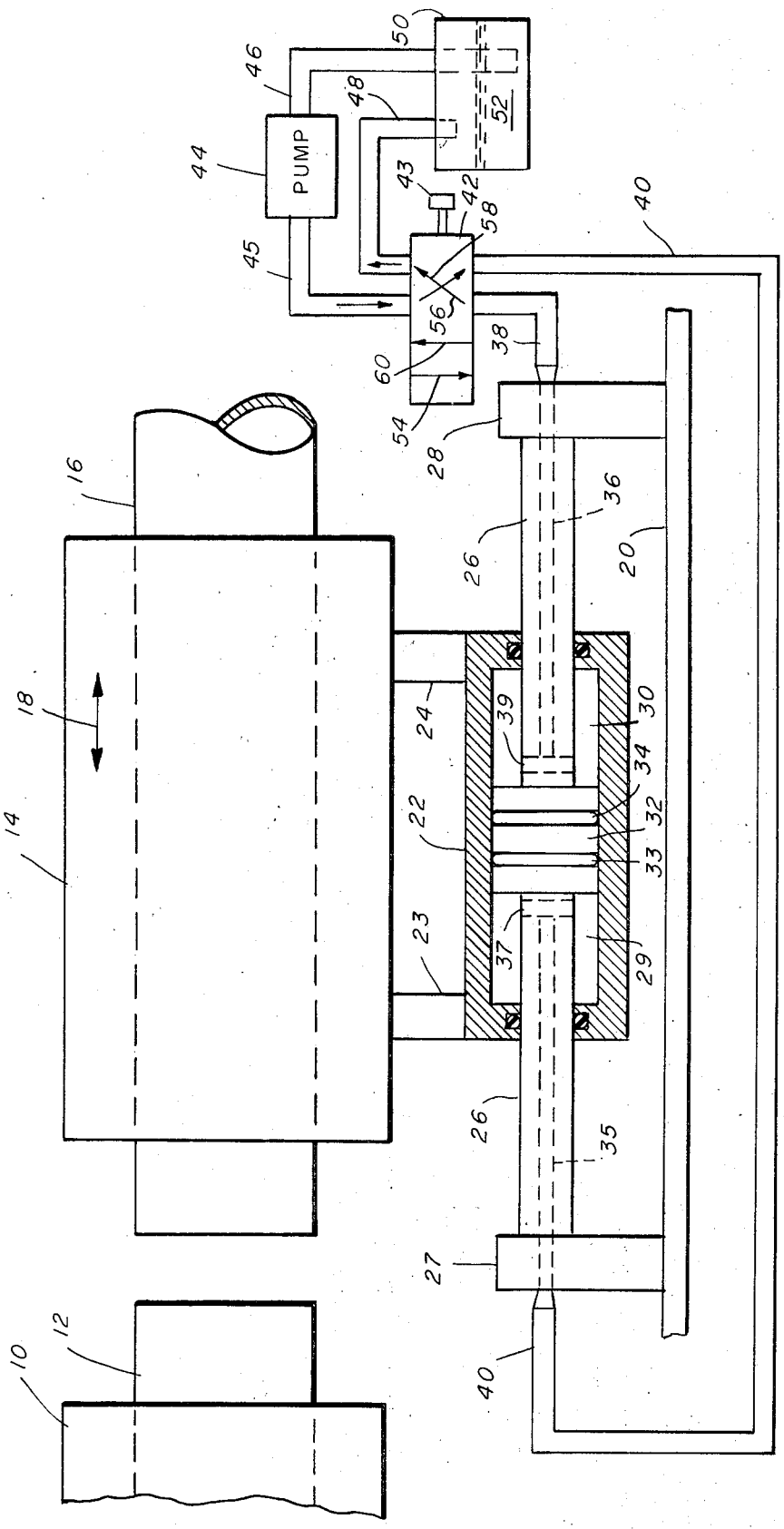
FIG. 2 shows the layout of the fixed and movable pipe clamps and pipes, and in cross section, the details of the pistons and cylinders.

Referring now to the drawings, the numeral 10 indicates the fixed pipe clamp and numeral 12 the end of the pipeline that has previously been assembled. The fixed pipe clamp 10 is supported by a frame 20. Coaxial with the pipe 12 is a length of pipe 16 which is to be joined by fusion to the pipe 12. The movable pipe 16 is supported in a movable pipe clamp 14 which is adapted to be moved axially according to the arrow 18. Mounted to the frame 20 is a rod 26 which is supported on posts 27 and 28 which are attached to the frame 20. In the embodiment shown there are two of the rods, only one of which is seen. The other is in a corresponding position, one on each side of the frame. They are precisely parallel to each other and to the axis of the fixed pipe 12. It can be seen that in other embodiments of the fusion units only one rod 26 may be employed, and in other embodiments more than two may be used, although the use of two parallel rods is the preferred arrangement. In the center of each rod is a piston 32 which has sealing rings 33 and 34. A cylinder 22 surrounds and is of shorter length than the rod. It is adapted, at its midpart, to seal against the circumference of the piston, and at its ends, it is adapted to slide along and to seal to the rod 26 which, in effect, comprises a piston rod and a support rod. The movable pipe clamp 14 is supported by posts 23 and 24.

The piston rod 26 is drilled along its axis, from each end, to provide conduits 35 and 36, which, by means of transverse holes 37 and 39, communicate with the spaces 29 and 30 inside of the cylinder on opposite sides of the piston.

A hydraulic liquid system is provided with a sump tank 50 with liquid 52. A pump 44 picks up the liquid through pipe 46 and delivers it through pipe 45 to a valve 42. Here, by means of a control 43 the high pressure liquid can be switched to pipe 38 or to pipe 40. When switched along arrow 54 to pipe 38 it travels by conduit 36, through hole 39, into chamber 30. At the same time the chamber 29 on the opposite side of the piston communicates through holes 37 and conduit 35 to pipe 40, back through the valve 42 and to the sump via arrow 60 and pipe 48. The high pressure liquid can be diverted through valve 42 via arrow 58 to pipe 40 and thence to the chamber 29 while the liquid in chamber 30 is diverted via arrow 56 back to the sump 50. Depending upon which side of the piston the high pressure liquid is applied, the cylinder will move in the direction corresponding to the position of the high pressure liquid, and will carry with it the movable clamp and the pipe 16. Thus, the control 43 provides a simple and rapid means of shifting the position of the movable pipe clamp 14.

No detail has been given of the construction of the frame and of the pipe clamps themselves, etc., since these parts of the fusion equipment are well known in the art and form no part of this invention which lies solely in the hydraulic means shown for traversing, in an axial direction, the movable pipe clamp and its pipe.

While the invention has been described with a certain degree of particularity it is manifest that many changes may be made in the details of construction and the arrangement of components. It is understood that the invention is not to be limited to the specific embodiments set forth herein by way of exemplifying the invention but the invention is to be limited only by the scope of the attached claim or claims, including the full range of equivalency to which each element or step thereof is entitled.

What is claimed is:

1. In a fusion joining apparatus for plastic pipe, including:
   a frame,
   a first pipe clamp fastened in fixed position on said frame;
   a second movable pipe clamp coaxial with said first clamp and mounted for axial motion along said frame, the improvement in mounting and control for said movable pipe clamp, comprising:
   a. at least one piston rod mounted on the frame parallel to the axis of said first pipe clamp;
   b. piston means on said piston rod, and cylinder means enclosing and sealing said piston and piston rod, said cylinder attached to and supporting said movable second pipe clamp;
   c. conduit means along the axis of, from each end of, said piston rod terminating in the cylinder spaced on each side of said piston; and
   d. means to apply pressurized liquid selectively to said conduit means;
   whereby said piston rod serves to conduct pressurized liquid to said cylinder, and to provide guide rail support for said movable pipe clamp.

2. The pipe joining apparatus as in claim 1 including two spaced apart piston rods each mounted parallel to the axis of said first pipe clamp, one on each side of said axis, and including piston means and cylinder means on each piston rod.

3. The pipe joining apparatus as in claim 1 including pressure liquid delivery means and pressure liquid withdrawal means, and including valve means to simultaneously deliver said pressure liquid to one pair of ends of said rods and withdraw the pressure liquid from the other pair of ends of said rods.

* * * * *